United States Patent
Todokoro

(10) Patent No.: US 11,131,654 B2
(45) Date of Patent: Sep. 28, 2021

(54) CHROMATOGRAPHY COLUMN

(71) Applicant: JNC CORPORATION, Tokyo (JP)

(72) Inventor: Masami Todokoro, Tokyo (JP)

(73) Assignee: JNC CORPORATION, Tokyo (JP)

( * ) Notice: Subject to any disclaimer, the term of this patent is extended or adjusted under 35 U.S.C. 154(b) by 116 days.

(21) Appl. No.: 16/343,786

(22) PCT Filed: Aug. 1, 2017

(86) PCT No.: PCT/JP2017/027810
§ 371 (c)(1),
(2) Date: Apr. 22, 2019

(87) PCT Pub. No.: WO2018/078991
PCT Pub. Date: May 3, 2018

(65) Prior Publication Data
US 2019/0250129 A1    Aug. 15, 2019

(30) Foreign Application Priority Data

Oct. 24, 2016   (JP) ............................ JP2016-207689

(51) Int. Cl.
*G01N 30/56*   (2006.01)
*G01N 30/60*   (2006.01)
(Continued)

(52) U.S. Cl.
CPC ........... *G01N 30/56* (2013.01); *B01D 15/206* (2013.01); *B01D 15/22* (2013.01); *G01N 30/60* (2013.01)

(58) Field of Classification Search
CPC ...... B01D 15/206; B01D 15/22; G01N 30/56; G01N 30/60; G01N 30/6017; G01N 30/6026
See application file for complete search history.

(56) References Cited

U.S. PATENT DOCUMENTS 5,693,223 A     12/1997   Yamada et al.
6,702,134 B2 *   3/2004   Scalese ............... B01L 3/50825
                                                             215/329
(Continued)

FOREIGN PATENT DOCUMENTS

GB         2413972          11/2005
JP         H07198701         8/1995
(Continued)

OTHER PUBLICATIONS

"International Search Report (Form PCT/ISA/210) of PCT/JP2017/027810," dated Oct. 24, 2017, with English translation thereof, pp. 1-4.

*Primary Examiner* — Waqaas Ali
(74) *Attorney, Agent, or Firm* — JCIPRNET

(57) ABSTRACT

A column mainly comprises a tube, a plug, a first filter, a second filter, a stopper, and a connector. The tube mainly comprises a bottomed cylindrical storage part, and a cylindrical bottom-side connection part connected to a bottom of the storage part. The storage part and the bottom-side connection part are coaxially provided. The plug mainly comprises an outer pipe coaxially provided, and an inner pipe provided on an inner side of the outer pipe. The first filter and the second filter each are such a filter as not to enable the filler to pass. The stopper mainly comprises a stopper gripping part, and a stopper insertion part. The connector mainly comprises a connector gripping part and a connector insertion part.

5 Claims, 4 Drawing Sheets

(51) Int. Cl.
    *B01D 15/20*    (2006.01)
    *B01D 15/22*    (2006.01)

(56) References Cited

U.S. PATENT DOCUMENTS

| | | |
|---|---|---|
| 2008/0202218 A1 | 8/2008 | Nagaoka et al. |
| 2012/0292242 A1 | 11/2012 | Hermansson et al. |
| 2014/0144825 A1* | 5/2014 | Ellis .................... B01D 15/165 210/198.2 |

FOREIGN PATENT DOCUMENTS

| | | | |
|---|---|---|---|
| JP | H09119924 | | 5/1997 |
| JP | 2008215857 | | 9/2008 |
| JP | 2010014545 | | 1/2010 |
| JP | 2010014545 A | * | 1/2010 |

* cited by examiner

CHROMATOGRAPHY COLUMN

CROSS-REFERENCE TO RELATED APPLICATION

This application is a 371 application of the international PCT application serial no. PCT/JP2017/027810, filed on Aug. 1, 2017, which claims the priority benefit of Japan application no. 2016-207689, filed on Oct. 24, 2016. The entirety of each of the above-mentioned patent applications is hereby incorporated by reference herein and made a part of this specification.

TECHNICAL FIELD

The present invention relates to a column for chromatography.

BACKGROUND OF THE INVENTION

Conventionally, a column has been known which is used for chromatography by filling filler made of a polymeric material as a stationary phase in a tube to block an opening of the tube with a sealing means, and increasing the pressure of the filler (refer to Patent Document 1).

RELATED ART

Patent Document

Patent Document 1: Japanese Patent Laid-Open No. H9-119924

SUMMARY OF THE INVENTION

Problem to be Solved

In a chromatography process, when a mobile phase containing a test object is poured into a column, the pressure of the inside of the column may be increased. At this case, if the sealing means is not reliably fixed to the tube, the sealing means is detached from the tube, and a risk that the filler or the mobile phase leaks out from the tube occurs. If the mobile phase leaks out from the tube, the test object is lost.

Filler used for purification of a biocomponent such as protein needs to be given suitable compression to be filled.

The present invention has been made in view of such problems as described above, and the present invention provides a column in which, in a chromatography process, filler can be filled in an optimally compressed state, and furthermore a mobile phase containing a test object is prevented from leaking out from a tube.

Solution to the Problem

The invention of this application includes the following [1] to [7].
[1] A column comprising:
  a tube; and
  a plug having an outer pipe, wherein
  the plug comprises an inner pipe that is provided on an inner side of the outer pipe, and a seal that projects from an outer side of the inner pipe,
  the tube comprises a rib that projects from an outer side of the tube,
  the outer pipe comprises an inner circumference larger than the outer side of the tube, and a hook that projects from the inner circumference of the outer pipe, and
  the tube is inserted in the inner circumference of the outer pipe, and the plug is mounted on an opening of the tube by engagement of the hook with the rib.
[2] The column according to [1], wherein an inner circumference of the tube has the largest opening area in the opening, and a sectional area orthogonal to an axis of the tube reduces as separating from the opening in the axial direction of the tube. Consequently, the inner pipe of the plug inserted from the opening can come in close contact with the inner circumference of the tube, and the inside of the tube is sealed from the outside.
[3] The column according to [1] or [2], wherein the plug further comprises a bottomed inner pipe provided on the inner side of the outer pipe, and has a groove on a surface located on an inner side of the tube in a bottom of the inner pipe in a state in which the plug is mounted on the tube. Consequently, a mobile phase flowing into the tube through the plug flows into the tube while spreading in a wide range.
[4] The column according to any one of [1] to [3], wherein the tube has a bottom, and has a groove on a surface located on an inner side of the tube in a bottom surface of the tube. Consequently, the mobile phase in the tube can be efficiently collected to be made to flow outside the tube.
[5] The column according to any one of [1] to [4], further comprising
  a first filter provided in contact with a surface located on an inner side of the tube in a bottom of the inner pipe in a state in which the plug is mounted on the tube. The first filter prevents a part of the filler from leaking from a hole formed in the plug to the outside.
[6] The column according to any one of [1] to [5], wherein the tube has a bottom, the column further comprising a second filter provided on a bottom surface of the tube. The second filter prevents a part of the filler from leaking from a hole formed in a bottom of the tube to the outside.
[7] The column according to any one of [1] to [6], further comprising a stationary phase having filler to be stored in the tube. Chromatography can be performed by use of the stationary phase. Consequently, a mobile phase flowing into the tube through the plug flows into the tube while spreading in a wide range.
[4] The column according to any one of claims [1] to [3], wherein the tube has a bottom, and has a groove on a surface located on an inner side of the tube in a bottom surface of the tube. Consequently, the mobile phase in the tube can be efficiently collected to be made to flow outside the tube.
[5] The column according to any one of [1] to [4], further comprising
  a first filter provided in contact with a surface located on an inner side of the tube in a bottom of the inner pipe in a state in which the plug is mounted on the tube. The first filter prevents a part of the filler from leaking from a hole formed in the plug to the outside.
[6] The column according to any one of [1] to [5], wherein the tube has a bottom, the column further comprising a second filter provided on a bottom surface of the tube. The second filter prevents a part of the filler from leaking from a hole formed in a bottom of the tube to the outside.
[7] The column according to any one of [1] to [6], further comprising a stationary phase having filler to be stored in the tube. Chromatography can be performed by use of the stationary phase.

Effect of the Invention

According to the present invention, a column in which, in a chromatography process, filler can be filled in an optimally compressed state, and furthermore a mobile phase containing a test object is prevented from leaking out from a tube is obtained.

Figure 1:
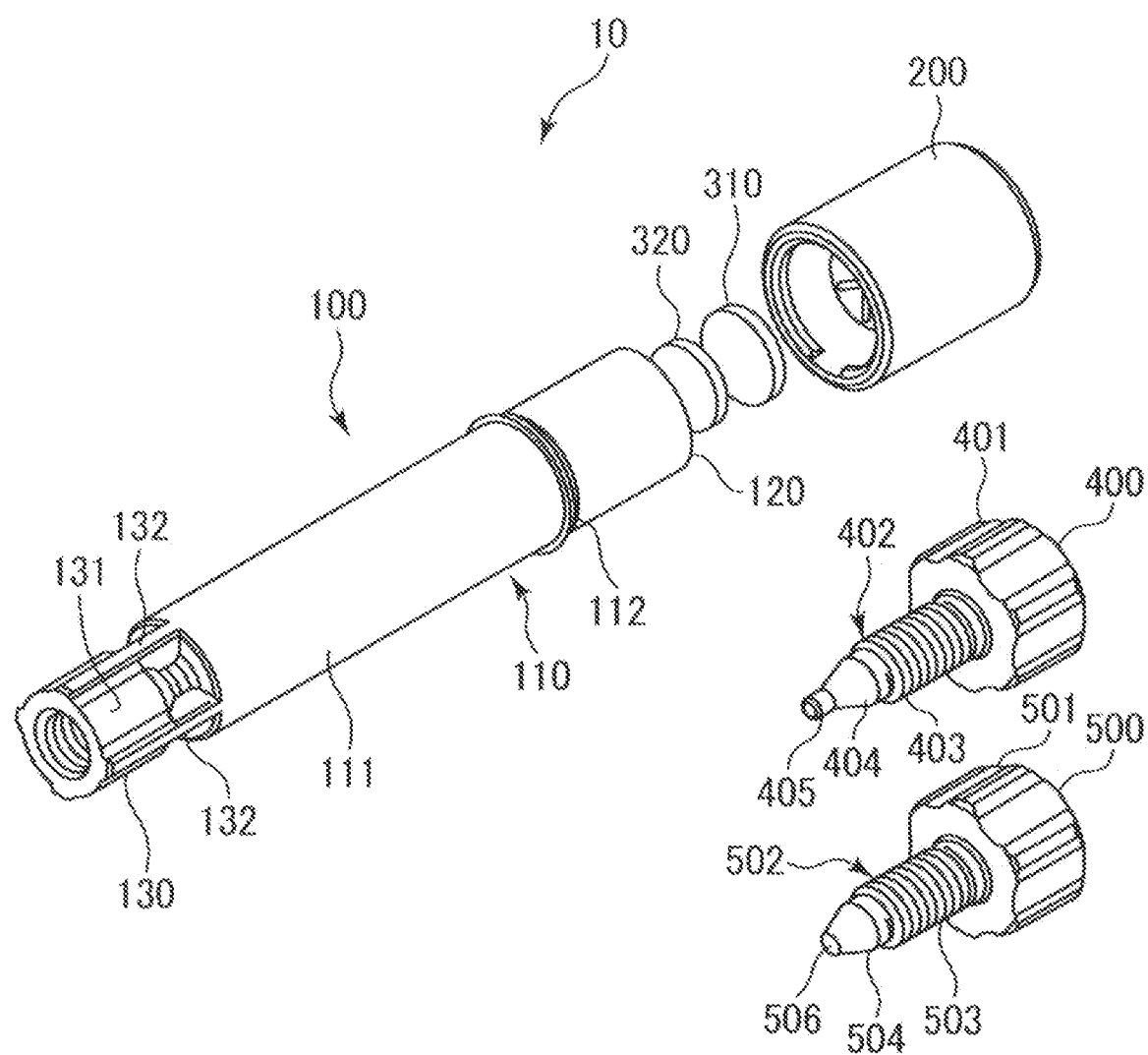
FIG. 1 is an exploded perspective view of a column.

EXPLANATIONS OF NUMERALS 10 column
100 tube
200 plug
310 first filter
320 second filter
400 stopper
500 connector

DESCRIPTION OF EMBODIMENTS

Hereinafter, a column 10 according to the present invention will be described with reference to FIGS. 1 to 4.

Figure 2:
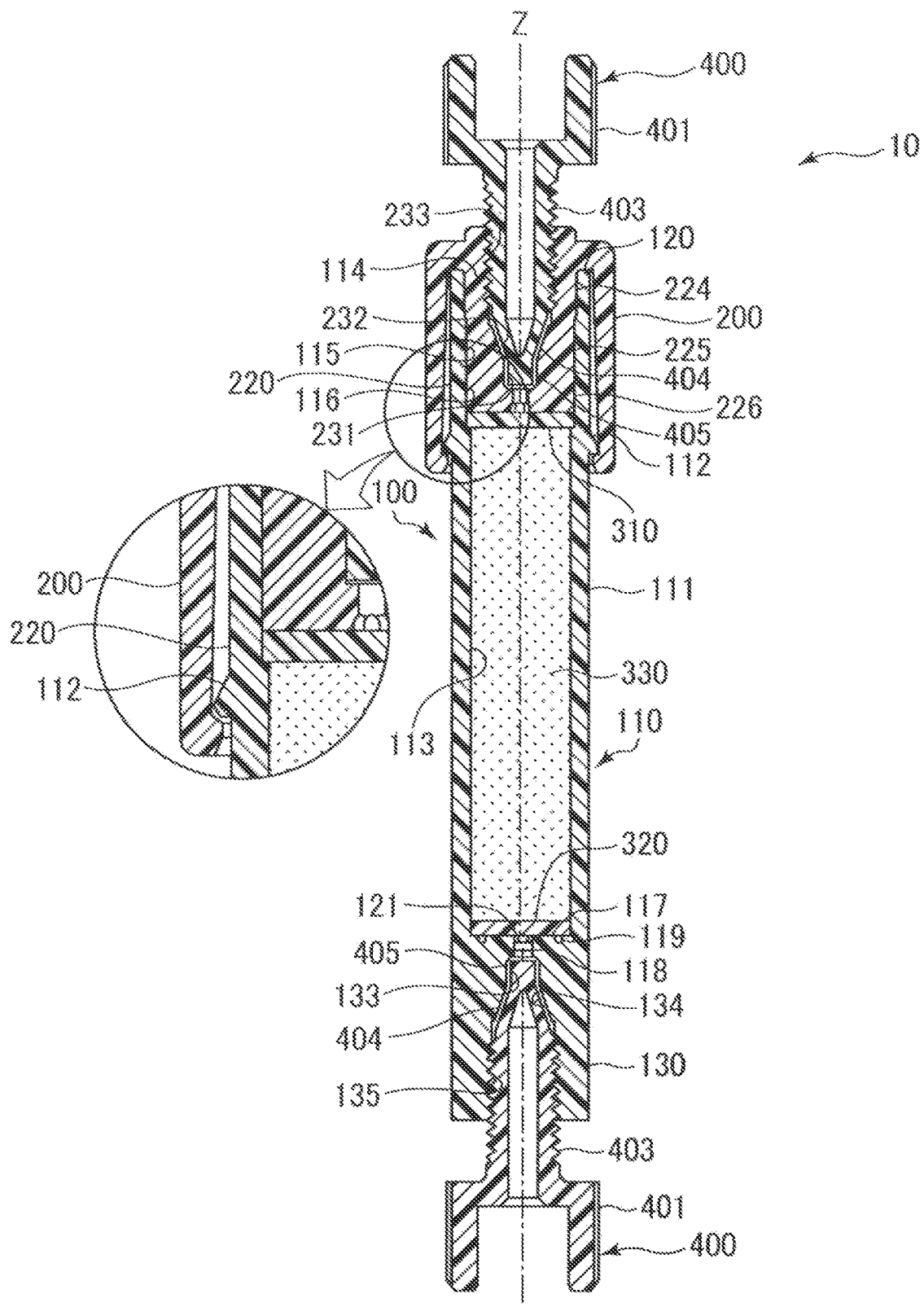
FIG. 2 is a sectional view of the column on a plane passing through an axis Z.

Referring to FIGS. 1 and 2, the column 10 is made of resin, and mainly comprises a tube 100, a plug 200, a first filter 310, a second filter 320, a stopper 400, and a connector 500.

The tube 100 mainly comprises a bottomed cylindrical storage part 110, and a cylindrical bottom-side connection part 130 connected to a bottom of the storage part 110. The storage part 110 and the bottom-side connection part 130 are coaxially provided.

The storage part 110 mainly comprises a fixed rib 112, a first receiving part 114, a second receiving part 115, a third receiving part 116, a hole 118, and a bottom surface groove 119.

The fixed rib 112 is provided on an outer circumferential surface 111 of the storage part 110, and projects radially outward from the outer circumferential surface 111 over a whole circumference in the circumferential direction of the outer circumferential surface 111. A cross-section of the fixed rib 112 on a plane passing through an axis Z of the tube 100 forms a triangle (refer to FIG. 2).

An inner circumference of an inner pipe 220 has the largest opening area in an opening 120 of the storage part 110, and a sectional area orthogonal to an axis of the inner pipe 220 reduces as separating from the opening 120 along the axis of the inner pipe 220. This configuration is implemented by the first receiving part 114, the second receiving part 115, and the third receiving part 116. The first receiving part 114, the second receiving part 115, and the third receiving part 116 are provided in an inner circumferential surface 113 of the storage part 110. The first receiving part 114 is a cylinder, and is provided at a position from the opening 120 of the storage part 110 to an inward side by a predetermined length along the axis Z. The second receiving part 115 is a cylinder, and is provided at a position inside by a predetermined length along the axis Z from the first receiving part 114. The third receiving part 116 is a cylinder, and is provided at a position inside by a predetermined length along the axis Z from the second receiving part 115. The inner diameter of the first receiving part 114 is longer than the inner diameter of the second receiving part 115, and the inner diameter of the second receiving part 115 is longer than the inner diameter of the third receiving part 116. That is, the inner diameters of the first receiving part 114, the second receiving part 115, and the third receiving part 116 become shorter in this order.

The hole 118 is a hole opened in a bottom surface 117 of the storage part 110, is provided on axes of the storage part 110 and the bottom-side connection part 130, and penetrates from the bottom surface 117 to an inner circumference of the storage part 110.

The bottom surface groove 119 is a recess carved on the bottom surface 117, and has of a circumferential groove provided along a circle with the hole 118 as the center, and three linear grooves each forming the diameter of the circumferential groove. The circumferential groove is provided near the inner circumferential surface of the storage part 110. The extending directions of the three linear grooves, namely, the longitudinal directions are orthogonal to the extending direction of the hole 118, and are disposed around the axis Z at equal angular intervals. The shapes of the three linear grooves are similar to shapes of plug grooves 228 described below.

The bottom-side connection part 130 comprises four reinforcing ribs 132 provided on an outer circumferential surface 131, and a bottom-side cylindrical part 133, a bottom-side widened part 134, and a bottom-side female screw part 135 provided on an inner circumferential surface. The reinforcing ribs 132 are arranged at equal intervals in the circumferential direction of the outer circumferential surface 131, and extend along the axis Z.

The bottom-side cylindrical part 133 is coaxial with the hole 118, has an outer diameter longer than the inner diameter of the hole 118, and has a bottom-side rib 121 at a connection part with the bottom surface 117. The bottom-side rib 121 slightly projects inward from an inner circumference of the bottom-side cylindrical part 133. The bottom-side widened part 134 has a truncated conical side surface, and is provided between the bottom-side cylindrical part 133 and the bottom-side female screw part 135. On an inner circumferential surface of the bottom-side female screw part 135, a female screw having a pitch, an inner diameter, and a diameter of a valley conforming to the existing standards, or differing from the existing standards is grooved.

Figure 3:
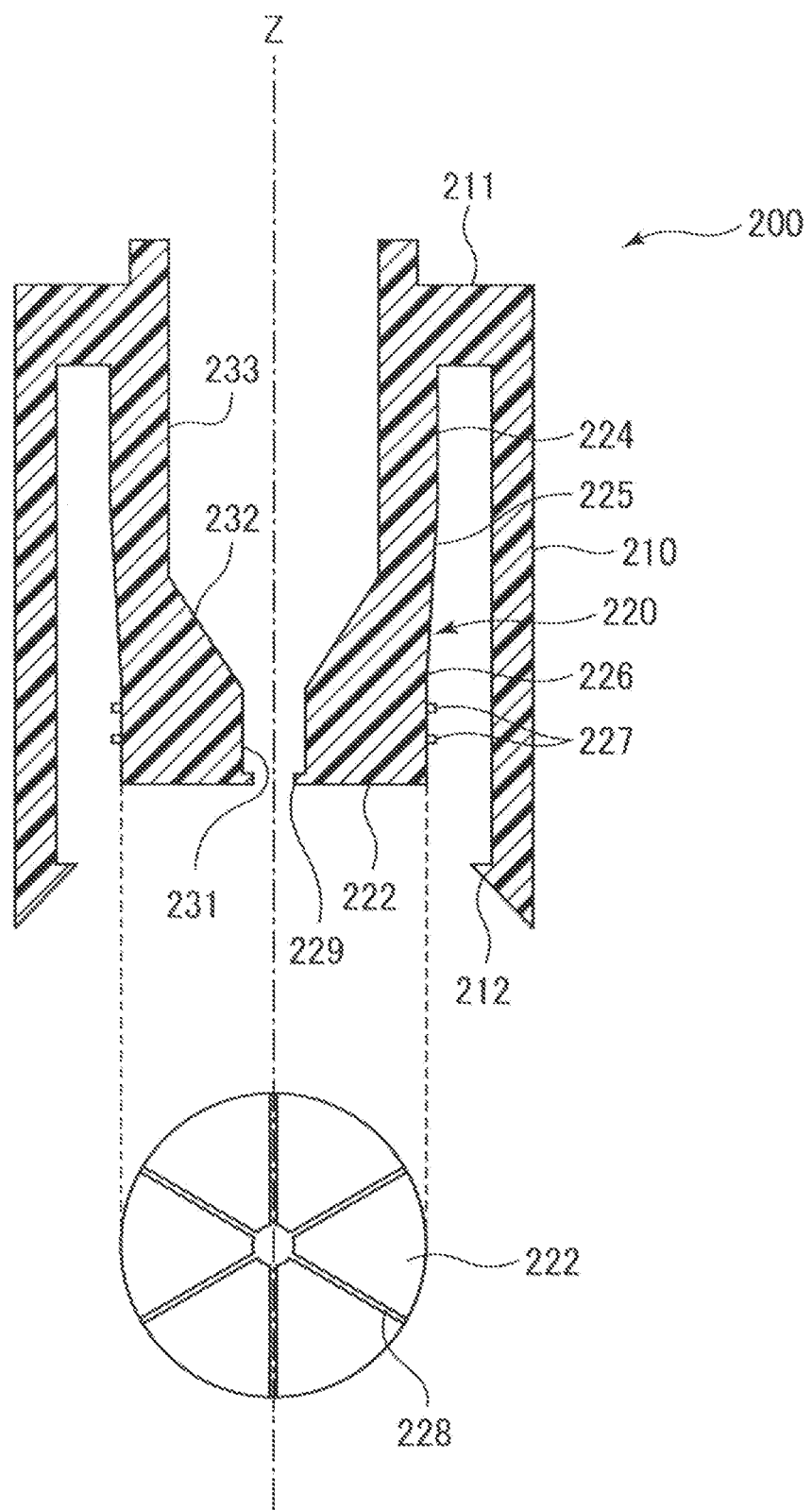
FIG. 3 is a sectional view of a plug on the plane passing through the axis Z, and a bottom view of the plug.

Referring to FIG. 3, the plug 200 mainly comprises an outer pipe 210 coaxially provided, and the inner pipe 220 provided on an inner side of the outer pipe 210.

The outer pipe 210 comprises a top part 211 projecting toward the inner side from one end of the outer pipe 210, and a hook 212 projecting inward from the inner circumferential surface near the other end. The top part 211 has an inner diameter larger than the outer diameter of the outer circumferential surface 111 of the tube 100, particularly the outer circumferential surface 111 of the storage part 110, and is connected to one end of the inner pipe 220. The hook 212 projects not on the whole circumference of the inner circumferential surface of the outer pipe 210, but in an intermittent manner. A cross-section of the hook 212 on the plane passing through the axis Z of the plug 200 forms a triangle.

The inner pipe 220 comprises a first insertion part 224, a second insertion part 225, a third insertion part 226, and a plurality of seals 227 provided on an outer circumferential surface of the inner pipe 220, the three linear plug grooves 228 provided on a bottom surface 222, and a plug cylindrical part 231, a plug widened part 232, and a plug female screw part 233 provided on an inner circumferential surface of the inner pipe 220.

The first insertion part 224 is a cylinder, and is provided over a predetermined length from the top part 211 of the inner pipe 220 toward the bottom surface 222 along the axis Z. The second insertion part 225 is a truncated cone, and is provided over a predetermined length from the first insertion part 224 toward the bottom surface 222 along the axis Z. The third insertion part 226 is a cylinder, and is provided over a predetermined length from the second insertion part 225 toward the bottom surface 222 along the axis Z. The outer diameter of the first insertion part 224 is longer than the outer diameter of the second insertion part 225, and the outer diameter of the second insertion part 225 is longer than the outer diameter of the third insertion part 226. That is, the outer diameters of the first insertion part 224, the second insertion part 225, and the third insertion part 226 become shorter in this order. The outer diameter of the first insertion part 224 is slightly longer than the inner diameter of the first receiving part 114, and the outer diameter of the second insertion part 225 is slightly longer than the inner diameter of the second receiving part 115.

The two seals 227 are arranged in the axial direction of the inner pipe 220, and slightly projects over the whole circumference from the outer circumferential surface of the inner pipe 220. The projecting lengths of the seals 227 are such lengths that the seals 227 are in close contact with the third receiving part 116 when the inner pipe 220 is inserted into the first receiving part 114 and the second receiving part 115.

The plug grooves 228 are recesses carved on the bottom surface 222. The extending directions of the plug grooves 228, namely, the longitudinal directions are orthogonal to the axis Z, and are disposed around the axis Z at equal angular intervals. In a state in which the plug 200 is mounted on the tube 100, the bottom surface 222 is a surface located on the inner side of the tube 100 in the bottom of the inner pipe 220. The state in which the plug 200 is mounted on the tube 100 will be described below.

The plug cylindrical part 231 is coaxial with the axis Z, and has a plug rib 229 at a connection part with the bottom surface 222. The plug rib 229 slightly projects inward from an inner circumference of the plug cylindrical part 231. The plug widened part 232 has a truncated conical side surface, and is provided between the plug cylindrical part 231 and the plug female screw part 233. On an inner circumferential surface of the plug female screw part 233, a female screw having a pitch, an inner diameter, and a diameter of a valley conforming to the existing standards, or differing from the existing standards is cut, similarly to the bottom-side female screw part 135. That is, the configuration of the plug cylindrical part 231 is similar to that of the bottom-side cylindrical part 133, the configuration of the plug widened part 232 is similar to that of the bottom-side widened part 134, and the configuration of the plug female screw part 233 is similar to that of the bottom-side female screw part 135, and the configuration of the plug rib 229 is similar to that of the bottom-side rib 121.

The first filter 310 and the second filter 320 each are a columnar filter having such high density as not to enable the filler 330 to pass. The outer diameters of the first filter 310 and the second filter 320 are substantially the same as the inner diameter of the inner circumferential surface 113. After the filler 330 is stored in the tube 100, the first filter 310 is inserted from the opening 120 of the storage part 110, and is provided so as to engage with a step between the second receiving part 115 and the third receiving part 116. Before the filler 330 is stored in the tube 100, the second filter 320 is inserted from the opening 120 of the storage part 110, and is provided in close contact with the bottom surface 117.

Referring to FIGS. 1 and 2, the stopper 400 mainly comprises a stopper gripping part 401, and a stopper insertion part 402. The stopper gripping part 401 is substantially cylindrical, and has an outer side having such a length as to enable gripping by fingers of a user. The stopper insertion part 402 mainly comprises a first stopper insertion part 403, a second stopper insertion part 404, and a third stopper insertion part 405 provided on an outer circumferential surface thereof.

The first stopper insertion part 403 has an outer diameter slightly longer than the inner diameter of the bottom-side cylindrical part 133, and can be inserted in the bottom-side cylindrical part 133. The second stopper insertion part 404 has an outer diameter slightly longer than the inner diameter of the bottom-side widened part 134, and can be inserted in the bottom-side widened part 134. The third stopper insertion part 405 has a male screw capable of being screwed with the bottom-side female screw part 135. The first stopper insertion part 403 has similar relation with the plug cylindrical part 231, the plug widened part 232, and the plug female screw part 233.

Referring to FIG. 1, the connector 500 mainly comprises a connector gripping part 501 and a connector insertion part 502. The connector gripping part 501 is substantially cylindrical, and has an outer side having such a length as to enable gripping by fingers of a user, and such an inner circumference as to enable insertion of the tube. The connector insertion part 502 mainly comprises a first connector insertion part 503 and a second connector insertion part 504 provided on an outer circumferential surface thereof, and a connector tube passage 506 provided on an inner circumference thereof. The configurations of the first connector insertion part 503 and the second connector insertion part 504 are similar to the configurations of the first stopper insertion part 403 and the second stopper insertion part 404, respectively, and therefore description thereof is omitted. The connector tube passage 506 penetrates an inner circumference of the connector gripping part 501, and allows a mobile phase carried through the tube to flow.

Figure 4:
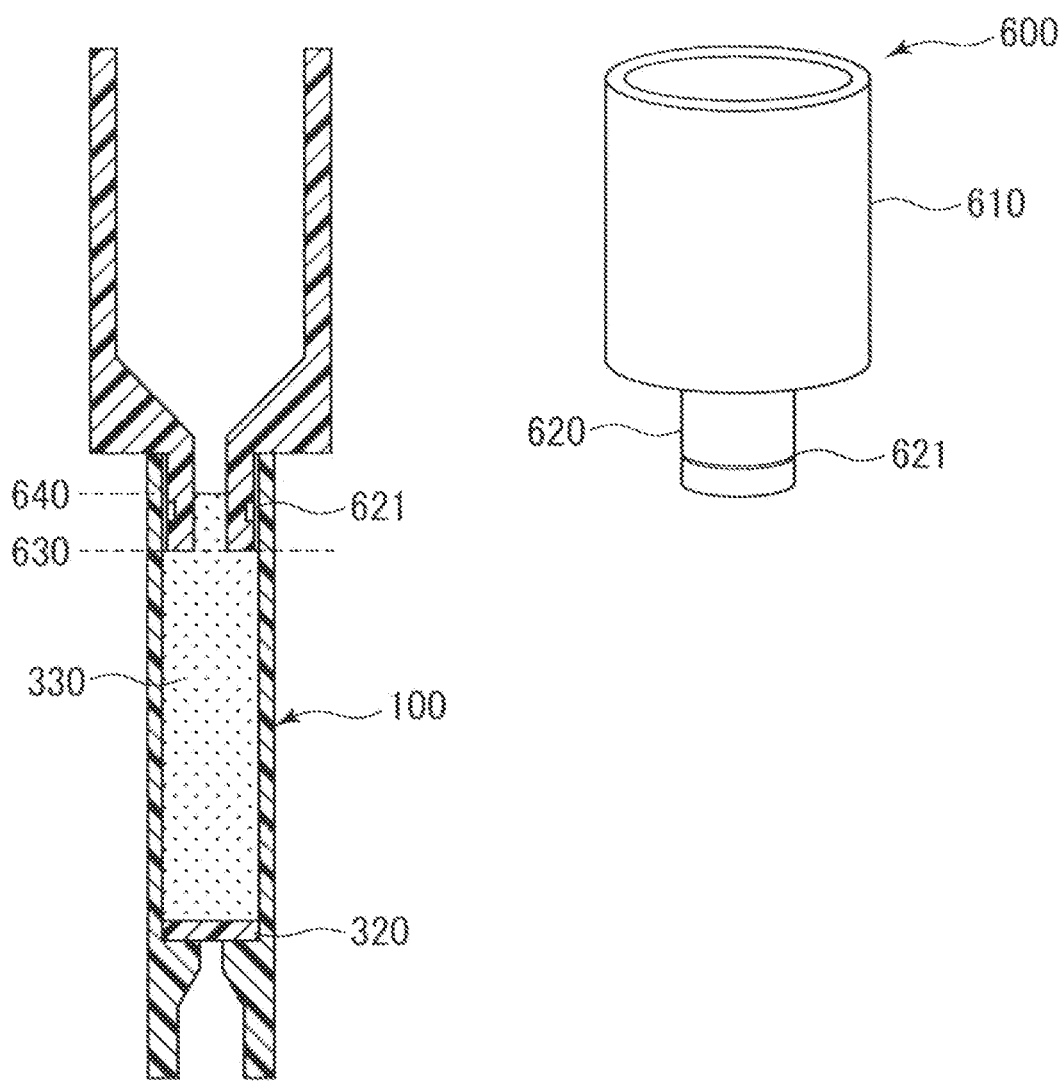
FIG. 4 is a sectional view of a packer and a tube, and a perspective view of the packer.

A packer 600 will be described with reference to FIG. 4. The packer 600 is a funnel used for filling the filler 330 in the storage part 110, and comprises a cylindrical packer upper part 610 and packer lower part 620. The inner diameter of the packer upper part 610 is longer than the inner diameter of the storage part 110, and the packer upper part 610 has a conically recessed bottom. The bottom is connected to an inner circumference of the packer lower part 620. The packer lower part 620 comprises an O-ring 621 mounted on an outer circumferential surface. When the packer lower part 620 is inserted into the storage part 110, the O-ring 621 comes into contact with the inner circumferential surface of the storage part 110, water tightness is ensured at a connection portion between the packer 600 and the storage part 110, and the filler 330 is prevented from leaking from the connection portion.

A procedure of assembling the column 10 will be described with reference to FIGS. 1 to 4.

First, the second filter 320 is inserted into the storage part 110. The second filter 320 is inserted from the opening 120 of the storage part 110, and is provided in close contact with the bottom surface 117. The stopper 400 is screwed into the bottom-side connection part 130. Consequently, a hole of the bottom-side rib 121 is blocked.

Then, the filler 330 is stored in the storage part 110. Means for storing the filler 330 will be described with reference to FIG. 4. First, the packer lower part 620 is inserted into the storage part 110, and the packer 600 is mounted on the tube 100. Then, the filler 330 is poured into the packer upper part 610. More specifically, the filler 330 poured herein is slurry obtained by suspending the filler 330 in a liquid. Then, when the stopper 400 mounted on the bottom-side connection part 130 is loosened, only liquid for filling flows outward from the bottom-side connection part 130. Consequently, the filling speed of the filler 330 becomes faster. Thereafter, the filler 330 is poured up to a position 640 higher than a filler bed height 630. After the filler 330 is made to flow in up to the desired position 640, the loosened stopper 400 is screwed in, and the hole of the bottom-side rib 121 is blocked. The filler 330 is made to simply flow into the storage part 110, and therefore is not filled in the storage part 110 densely.

Now, referring to FIGS. 2 and 3, the first filter 310 is inserted into the storage part 110, and the plug 200 is then inserted. At this time, the stopper 400 is screwed into the inner circumference of the inner pipe 220, and consequently, a hole of the plug rib 229 is blocked. As described above, when the filler 330 is made to simply flow into the storage part 110, the filler 330 is not filled in the storage part 110 densely. Therefore, in this embodiment, from above the filler 330 poured up to the position 640, the bottom surface 222 pushes the filler 330 into the storage part 110 through the first filter 310. During the pushing of the plug 200 into the storage part 110, the stopper 400 screwed into the plug 200 is loosened, and liquid for filling is discharged outward through the plug rib 229, the plug cylindrical part 231, the plug widened part 232, and the plug female screw part 233. When the plug 200 continues to be pushed into the storage part 110, in the plug 200 and the tube 100, an outer circumferential surface of the first insertion part 224 comes into close contact with an inner circumferential surface of the first receiving part 114, and an outer circumferential surface of the second insertion part 225 comes into close contact with an inner circumferential surface of the second receiving part 115. Furthermore, the plurality of seals 227 come into close contact with the third receiving part 116. Consequently, the opening 120 of the storage part 110 is sealed. That is, the seals 227 come into contact with an inner circumferential surface of the tube 100, so that the inside of the tube 100 is sealed from the outside. Finally, the hook 212 engages with the fixed rib 112, and the plug 200 is completely mounted on the tube 100, and is not detached. Consequently, in a state in which the filler 330 is densely filled in the storage part 110, the plug 200 is fixed to the tube 100. Thereafter, the stopper 400 is screwed into the plug 200 again to block the hole of the plug rib 229. Consequently, the filler 330 is densely filled in the storage part 110, and a stationary phase is formed in the storage part 110. The degree of compression, a so-called compression coefficient is provided by a manufacturing company of the filler 330, and is generally obtained by the following calculation expression.

"Deposition Height of Stationary Phase due to Natural Drop"÷"Filling Height of Suitable Stationary Phase"="Compression Coefficient", where the "Deposition Height of Stationary Phase due to Natural Drop" is a length from a top surface of the second filter 320 to the position 640, and the "Filling Height of Suitable Stationary Phase" is a length from the top surface of the second filter 320 to the position 630.

When the column 10 is used, the stopper 400 is detached from the plug 200 and the bottom-side connection part 130, and the connector 500 is screwed in place of the stopper 400. Then, a desired tube is connected to the connector 500, a mobile phase containing a test object is allowed to flow into the column 10, and chromatography is performed.

When the mobile phase containing the test object is allowed to flow into the column 10, the mobile phase flows from the hole of the plug rib 229 to the first filter 310 while traveling along the three linear plug grooves 228. The mobile phase travels along the three linear plug grooves 228, and therefore liquid spreads more widely to flow on the first filter 310 compared to a case in which there are no three linear plug grooves 228, that is, only the hole of the plug rib 229 is provided. Therefore, it is possible to more accurately implement chromatography.

When the mobile phase reaches the second filter 320 through the filler 330, the mobile phase flows in the hole of the bottom-side rib 121 while traveling along the three linear bottom surface groove 119. The mobile phase travels along the three linear bottom surface groove 119, and therefore a large amount of mobile phase can be promptly recovered over a wider range compared to a case in which there are not the three linear bottom surface groove 119, that is, only the hole of the bottom-side rib 121 is provided. Therefore, it is possible to more accurately and promptly implement chromatography.

According to this embodiment, it is possible to obtain a column in which, in a chromatography process, filler can be filled in an optimally compressed state, furthermore a mobile phase containing a test object is prevented from leaking out from a tube, and chromatography can be implemented more accurately and promptly.

Each of the tube 100, the storage part 110, and the bottom-side connection part 130 may not be a cylinder, or may be a tube having a rectangular cross-section, and only needs to have a tubular shape.

The column 10 only needs to comprise at least the tube 100 and the plug 200, and may not comprise the first filter 310, the second filter 320, the stopper 400, and the connector 500.

The number of the seals 227 may not be two, but may be one or three or more. Additionally, the seals 227 may be provided on the inner circumferential surface 113 of the storage part 110.

The column 10 may not be made of resin, but all or a part of the column 10 may be made of a metal material.

The bottom surface groove 119 and the plug grooves 228 are not limited to the above shapes. The number of the linear grooves may not be three, or may be one or more. The shape of the three linear grooves in the bottom surface groove 119 may not be similar to the shape of the plug grooves 228.

The hook 212 may be provided on the whole circumference of the inner circumferential surface of the outer pipe 210, and the fixed rib 112 may not be provided over the whole circumference in the circumferential direction of the outer circumferential surface 111, but may project intermittently.

The size of each member described in this specification and the drawings is an example, and the present invention is not limited to these sizes. Additionally, the material of each member is an example, and the present invention is not limited to these materials.

Although the embodiment of the present invention is described with reference to the accompanying drawings, it will be obvious to those skilled in the art that a structure and relation of each component may be modified within the scope and spirit of the present invention described herein.

The invention claimed is:

1. A column comprising:
a tube; and
a plug having an outer pipe, wherein
the plug comprises an inner pipe that is provided in an interior of the outer pipe, and a seal that projects from an outer side of the inner pipe and contacts with an inner side of the tube,
the tube comprises a rib that projects from an outer side of the tube,
the outer pipe comprises an inner circumference larger than the outer side of the tube, and a hook that projects from the inner circumference of the outer pipe, and
the tube is inserted in the inner circumference of the outer pipe, and the plug is mounted on an opening of the tube by engagement of the hook with the rib, wherein
the inner pipe has a bottom and a groove on a surface located on an inner side of the tube in the bottom of the inner pipe in a state in which the plug is mounted on the tube, and
the groove is a recess extending radially on the surface of the bottom of the inner pipe
wherein the column further comprises a first filter provided in contact with the surface located on the inner side of the tube in the bottom of the inner pipe in a state in which the plug is mounted on the tube.

2. The column according to claim 1, wherein
a sectional area orthogonal to a longitudinal axis of the tube reduces as separating from the opening in the axial direction of the tube.

3. The column according to claim 1, wherein the tube has a bottom, and has a groove on a surface located on an inner side of the tube in a bottom surface of the tube.

4. The column according to claim 1, wherein
the tube has a bottom, and the column further comprising a second filter provided on a bottom surface of the tube.

5. The column according to claim 1, further comprising a stationary phase having filler to be stored in the tube.

* * * * *